United States Patent
Shen et al.

(10) Patent No.: US 11,240,833 B2
(45) Date of Patent: Feb. 1, 2022

(54) INFORMATION TRANSMISSION METHOD, USER EQUIPMENT AND NETWORK DEVICE

(71) Applicant: VIVO MOBILE COMMUNICATION CO., LTD., Chang'an Dongguan (CN)

(72) Inventors: Xiaodong Shen, Chang'an Dongguan (CN); Xueming Pan, Chang'an Dongguan (CN); Yu Ding, Chang'an Dongguan (CN); Zhi Lu, Chang'an Dongguan (CN)

(73) Assignee: VIVO MOBILE COMMUNICATION CO., LTD, Guangdong (CN)

( * ) Notice: Subject to any disclaimer, the term of this patent is extended or adjusted under 35 U.S.C. 154(b) by 28 days.

(21) Appl. No.: 16/646,056

(22) PCT Filed: Aug. 31, 2018

(86) PCT No.: PCT/CN2018/103573
§ 371 (c)(1),
(2) Date: Mar. 10, 2020

(87) PCT Pub. No.: WO2019/047787
PCT Pub. Date: Mar. 14, 2019

(65) Prior Publication Data
US 2020/0205183 A1   Jun. 25, 2020

(30) Foreign Application Priority Data
Sep. 11, 2017   (CN) .......................... 201710813049.2

(51) Int. Cl.
*H04W 72/12*   (2009.01)

(52) U.S. Cl.
CPC ... *H04W 72/1284* (2013.01); *H04W 72/1257* (2013.01)

(58) Field of Classification Search
CPC ......... H04W 72/1284; H04W 72/1257; H04W 72/1289; H04W 72/04; H04W 72/02
USPC .................................................. 370/329–330
See application file for complete search history.

(56) References Cited

U.S. PATENT DOCUMENTS

2010/0195629 A1   8/2010   Chen et al.
2013/0235768 A1   9/2013   Earnshaw et al.
(Continued)

FOREIGN PATENT DOCUMENTS

CN   101977099 A   2/2011
CN   102123008 A   7/2011
(Continued)

OTHER PUBLICATIONS

International Search Report & Written Opinion related to Application No. PCT/CN2018/103573; dated Oct. 31, 2018.
(Continued)

*Primary Examiner* — Candal Elpenord
(74) *Attorney, Agent, or Firm* — von Briesen & Roper, s.c.

(57) ABSTRACT

The present disclosure provides an information transmission method, a user equipment and a network device. The information transmission method includes: when collision between scheduling request (SR) information to be transmitted by the UE and information on physical uplink control channel (PUCCH) occurs, transmitting the SR information and/or the information on the PUCCH.

12 Claims, 4 Drawing Sheets when collision between SR information to be transmitted by the UE and information on PUCCH occurs, transmitting the SR information and/or the information on PUCCH — 101

(56) References Cited

U.S. PATENT DOCUMENTS

| | | | |
|---|---|---|---|
| 2014/0219201 A1 | 8/2014 | Xu et al. | |
| 2015/0288503 A1* | 10/2015 | Earnshaw | H04L 5/006 370/280 |
| 2017/0163388 A1 | 6/2017 | Wiemann et al. | |
| 2017/0325219 A1 | 11/2017 | Zhang | |
| 2018/0220415 A1* | 8/2018 | Yin | H04W 72/0413 |
| 2018/0279291 A1* | 9/2018 | Tiirola | H04B 1/713 |
| 2019/0174472 A1* | 6/2019 | Lee | H04W 72/042 |
| 2020/0288487 A1* | 9/2020 | Liu | H04L 5/0053 |
| 2021/0143948 A1* | 5/2021 | Choi | H04L 5/0012 |

FOREIGN PATENT DOCUMENTS

| | | |
|---|---|---|
| CN | 103580815 A | 2/2014 |
| CN | 104170508 A | 11/2014 |
| CN | 105991209 A | 10/2016 |
| CN | 107046718 A | 8/2017 |
| WO | 2011019795 A1 | 2/2011 |
| WO | 2013010440 A1 | 1/2013 |

OTHER PUBLICATIONS

Extended European Search Report for related Application No. 18853208.9; dated September 28, 2020.
Hisilicon Huawei, "sPUCCH", Aug. 21-25, 2017, 3GPP TSG RAN WG1 Meeting #90, Prague, CZ.
Hisilicon Huawei, "Discussion on SR in shortened TTI scenario", Aug. 21-25, 2017, 3GPP TSG RAN WG1 Meeting #90, Prague, CZ.
Chinese Office Action for related Application No. 201710813049.2; dated Mar. 19, 2021.

* cited by examiner

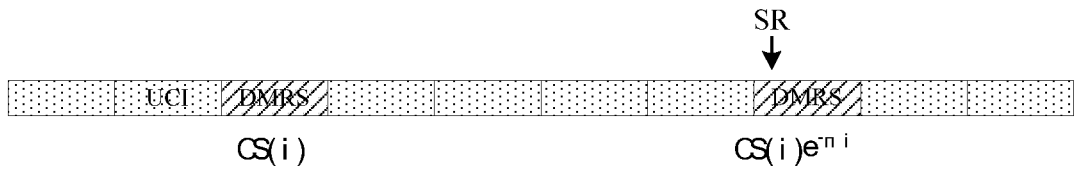
FIG. 1
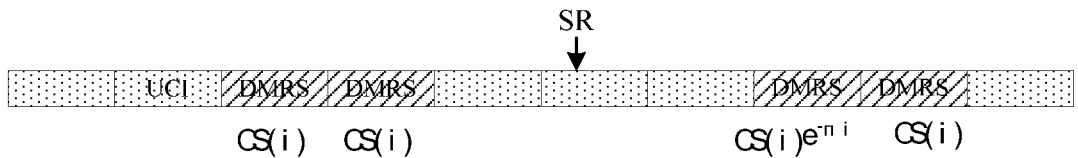
FIG. 2A
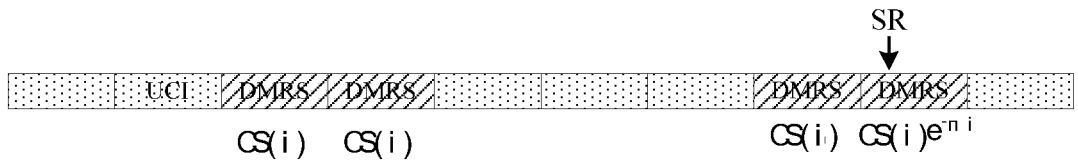
FIG. 2B
FIG. 2C
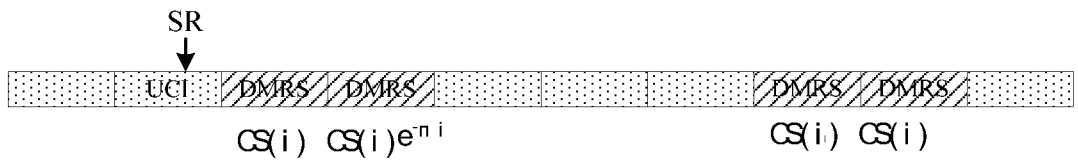
FIG. 3
FIG. 4

INFORMATION TRANSMISSION METHOD, USER EQUIPMENT AND NETWORK DEVICE

CROSS-REFERENCE TO RELATED APPLICATION

This patent application is a 35 USC § 371 U.S. national stage of International Application No. PCT/CN2018/103573 filed on Aug. 31, 2018, which claims the benefit and priority to Chinese Patent Application No. 201710813049.2 filed on Sep. 11, 2017, which is incorporated herein by reference in its entirety.

TECHNICAL FIELD

The present disclosure relates to the field of communication technologies, and in particular to an information transmission method, a user equipment and a network device.

BACKGROUND

Currently, 5th-Generation New Radio (5G NR) introduces a variety of physical uplink control channel (PUCCH) structures, such as short PUCCH structure of 1 to 2 symbols, and long PUCCH structure of 4 to 14 symbols. 5G NR further extends specific supported waveforms compared to the long-term evolution (LTE), in addition to supporting the existing Discrete Fourier Transform-Spread OFDM, DFT-S-OFDM in LTE, 5G NR additionally supports Cyclic Prefix OFDM (CP-OFDM) waveform to maintain symmetry and consistency of uplink and downlink waveforms.

Expected PUCCH formats and corresponding features supported by NR may be shown in the following table 1. Formats 0 and 1 are for the short PUCCH structure, and formats 2, 3 and 4 are for the long PUCCH structure.

TABLE 1

| PUCCH format | OFDM symbol length | bit |
|---|---|---|
| 0 | 1-2 | ≤2 |
| 1 | 4-14 | ≤2 |
| 2 | 1-2 | >2 |
| 3 | 4-14 | >2, ≤N |
| 4 | 4-14 | >N |

Generally, when a User Equipment (UE) has no uplink data to transmit, a base station does not need to allocate uplink resources for the UE to avoid waste of resources. Then, the UE needs to inform the base station whether it has any uplink data to be transmitted, so that the base station decides whether to allocate uplink resources for the UE. Therefore, LTE/NR provides an uplink scheduling request (SR) mechanism. Since the UE transmits SR information as it has no physical uplink shared channel (PUSCH) resource, the UE has to transmit the SR information on the PUCCH. The base station may allocate a dedicated SR resource to each UE for transmitting the SR. The SR resource is periodic and appears every n sub-frames. The period and start position of the SR may be pre-configured through higher layer signaling.

In LTE, the minimum period of the SR may be configured to be 1 ms, that is, the SR resource is reserved for the UE in each uplink sub-frame. When the UE has uplink service and needs to trigger the SR, the UE may prepare SR information and PUCCH signal in advance, for example, carrying the SR information on the PUCCH.

However, in NR, the minimum period configured for the SR is expected to be accurate to 1 OFDM symbol (equivalent to $\frac{1}{14}$ ms at 15 KHz subcarrier interval), while the length of the PUCCH may be greater than 1 OFDM symbol. Since the triggering of the SR is unpredictable, in the NR, when the SR information and information on PUCCH (especially long PUCCH) are simultaneously transmitted, the following problems may occur: collision between the SR information and demodulation reference signal (DMRS) on the PUCCH (Demodulation), and collision between the SR information and uplink control information (UCI) on the PUCCH. However, at present, there is no conclusion as to how to solve the collision problem occurring when the SR information and the information on the PUCCH are simultaneously transmitted.

SUMMARY

In a first aspect, one embodiment of the present disclosure provides an information transmission method applied to a user equipment (UE), including: when collision between scheduling request (SR) information to be transmitted by the UE and information on physical uplink control channel (PUCCH) occurs, transmitting the SR information and/or the information on the PUCCH.

In a second aspect, one embodiment of the present disclosure provides an information transmission method applied to a network device, including: when collision between scheduling request (SR) information to be transmitted by a user equipment (UE) and information on physical uplink control channel (PUCCH) occurs, receiving the SR information and/or the information on the PUCCH transmitted by the UE.

In a third aspect, one embodiment of the present disclosure provides a user equipment (UE), including: a transmission module configured to, when collision between scheduling request (SR) information to be transmitted by the UE and information on physical uplink control channel (PUCCH) occurs, transmit the SR information and/or the information on the PUCCH.

In a fourth aspect, one embodiment of the present disclosure provides a network device including: a receiving module configured to, when collision between scheduling request (SR) information to be transmitted by a user equipment (UE) and information on physical uplink control channel (PUCCH) occurs, receive the SR information and/or the information on the PUCCH transmitted by the UE.

In a fifth aspect, one embodiment of the present disclosure provides a user equipment (UE) including: a memory, a processor, and a computer program stored on the memory and executable on the processor; wherein the computer program is executed by the processor to implement steps of the above information transmission method.

In a sixth aspect, one embodiment of the present disclosure provides a network device including: a memory, a processor, and a computer program stored on the memory and executable on the processor; wherein the computer program is executed by the processor to implement steps of the above information transmission method.

In a seventh aspect, one embodiment of the present disclosure provides a computer readable storage medium including a computer program stored thereon; wherein the computer program is executed by a processor to implement the steps of the above information transmission method applied to the UE.

In an eighth aspect, one embodiment of the present disclosure provides a computer readable storage medium including a computer program stored thereon; wherein the computer program is executed by a processor to implement the steps of the above information transmission method applied to the network device.

BRIEF DESCRIPTION OF THE DRAWINGS

FIG. 1 is a flowchart of an information transmission method according to an embodiment of the present disclosure;

FIGS. 2A, 2B and 2C are schematic diagrams showing phase rotation on a symbol at a DMRS position according to a first example of the present disclosure;

FIG. 3 is a schematic diagram showing phase rotation on a symbol at a DMRS position according to a second example of the present disclosure;

FIG. 4 is a flowchart of an information transmission method according to another embodiment of the present disclosure;

DETAILED DESCRIPTION

Figure 5:
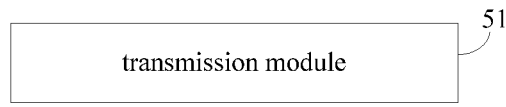
FIG. 5 is a first schematic diagram of a user equipment according to an embodiment of the present disclosure.

In order to more clearly illustrate the technical solutions of the embodiments of the present disclosure, the drawings to be used in the embodiments of the present disclosure will be briefly described below. It is obvious that the drawings in the following description are only some embodiments of the present disclosure, those skilled in the art can also obtain other drawings based on these drawings without paying for creative labor.

As shown in FIG. 1, one embodiment of the present disclosure provides an information transmission method, which is applied to a user equipment (UE), and includes the following steps.

Step 101: when collision between SR information to be transmitted by the UE and information on PUCCH occurs, transmitting the SR information and/or the information on PUCCH.

The SR information may collide with DMRS on the PUCCH or may collide with UCI on the PUCCH. When the SR information to be transmitted by the UE collides with the information on the PUCCH, for example, triggering SR when the PUCCH is transmitted halfway, the UE may stop transmitting the information on the PUCCH and transmit the corresponding SR information, or may continue transmitting the information on the PUCCH without transmitting the SR information, or may simultaneously transmit the SR information and the information on the PUCCH.

In the information transmission method of the embodiment of the present disclosure, when collision between the SR information to be transmitted by the UE and information on PUCCH occurs, the UE transmits the SR information and/or the information on PUCCH, thereby solving the collision problem occurring when the SR information and the information on the PUCCH are simultaneously transmitted, and clearly defining how the UE transmits information when the SR information collides with the information on the PUCCH.

In one embodiment of the present disclosure, when collision between the SR information to be transmitted by the UE and the information on PUCCH occurs, the UE may selectively transmit the SR information or the information on PUCCH, according to a predetermined criterion, such as a protocol agreement or a pre-arrangement of the UE and the network device. Specifically, the step 101 may include:

when collision between the SR information to be transmitted and the information on PUCCH occurs, transmitting, by the UE, the SR information or the information on PUCCH, according to a predetermined criterion, status information of the PUCCH and/or service type corresponding to the SR.

The status information of the PUCCH may include one or more of the following information: content carried by the PUCCH, payload size of the PUCCH, PUCCH format, and symbol length of the PUCCH. The content carried by the PUCCH may be, for example, whether the PUCCH carries ACK/NACK information.

When the status information of the PUCCH includes the content carried by the PUCCH, the above predetermined criterion may include:

when the content carried by the PUCCH includes ACK/NACK information, the UE transmits the information on the PUCCH, and does not transmit the SR information; or, when the content carried by the PUCCH does not include ACK/NACK information, the UE transmits the SR information and stops transmission of the information on the PUCCH.

Some preset criteria involved in embodiments of the present disclosure are described hereinafter with the following table 2, but the embodiments of the present disclosure are not limited thereto. It should be noted that the preset criteria in the table 2 are related to the PUCCH format, and some are further related to the content carried by the PUCCH. First situation is that SR collides with PUCCH of long PUCCH format carrying information which is less than or equal to 2 bits. Second situation is that SR collides with PUCCH of long PUCCH format carrying information which is greater than 2 bits and less than or equal to N bits. When the UE is in the first situation or the second situation, the UE may transmit information according to the criteria in the table 2.

TABLE 2

| option | first situation | second situation | advantage |
|---|---|---|---|
| 1 | transmitting SR information (discarding long PUCCH) | transmitting SR information | transmission of SR is ensured to the largest extent |

TABLE 2-continued

| option | first situation | second situation | advantage |
|---|---|---|---|
| 2 | transmitting SR information | transmitting information on long PUCCH | this scene is not suitable |
| 3 | transmitting information on long PUCCH (discarding SR) | when UCI includes ACK/NACK, transmitting SR information when UCI does not include ACK/NACK, transmitting SR information | PUCCH performance is maximized |
| 4 | transmitting information on long PUCCH | when UCI includes ACK/NACK, transmitting information on long PUCCH when UCI does not include ACK/NACK, transmitting SR information | A/N performance is maximized, but SR performance deteriorates |
| 5 | transmitting information on long PUCCH | transmitting information on long PUCCH | PUCCH performance is maximized, but SR performance deteriorates |

In addition, the preset criteria involved in the embodiments of the present disclosure may further be related to the service type corresponding to the SR. For example, when the SR of the UE collides with the long PUCCH and the service type corresponding to the SR is enhanced mobile broadband (eMBB) service, then, the UE can transmit the information on the long PUCCH and abandon transmission of the SR information according to the predetermined criterion. When the SR of the UE collides with the long PUCCH and the service type corresponding to the SR is ultra reliable low latency communications (URLLC) service, then, the UE can transmit the SR information and stop transmitting the information on the long PUCCH according to the predetermined criterion.

In one embodiment of the present disclosure, when collision between the SR information to be transmitted by the UE and the information on PUCCH occurs, the UE may selectively transmit the SR information or the information on PUCCH, according to configuration of the network device. Specifically, the step 101 may include:

when collision between the SR information to be transmitted by the UE and the information on PUCCH occurs, transmitting, by the UE, the SR information or the information on PUCCH, according to a configuration signaling transmitted by the network device.

The configuration signaling is used to instruct the UE to transmit the SR information or the information on the PUCCH when the SR information to be transmitted by the UE collides with the information on the PUCCH.

In one embodiment of the present disclosure, the configuration signaling transmitted by the network device may be specifically used to instruct the UE to:

when the PUCCH is in long PUCCH format and carries information which is less than or equal to 2 bits, transmit the SR information or the information on the PUCCH; and/or, when the PUCCH is in short PUCCH format and carries information which is greater than 2 bits, transmit the SR information or the information on the PUCCH; and/or, when the PUCCH is in long PUCCH format and carries information which is greater than 2 bits and less than or equal to N bits, transmit the SR information or the information on the PUCCH; and/or, when the PUCCH is in long PUCCH format and carries information which is greater than N bits, transmit the SR information or the information on the PUCCH;

where N is a positive integer greater than 2.

It should be noted that the configuration signaling transmitted by the network device may be one or multiple signalings. The one signaling may indicate one or more configurations. Each of the multiple signalings may correspond to at least one configuration. That is, when the network device has multiple configurations and these configurations may be indicated by one signaling or multiple signalings with each signaling corresponding to at least one configuration. For example, each configuration is indicated by independent signaling.

In one embodiment of the present disclosure, when the SR information to be transmitted by the UE collides with the information on the PUCCH, the UE may simultaneously transmit the SR information and the information on the PUCCH by modulating DMRS on the PUCCH to carry the SR information, thereby ensuring transmission of the PUCCH as well as the scheduling request. It should be noted that the this embodiment applied to PUCCH which is in long PUCCH format and carries information greater than 2 bits, so as to modulate DMRS to carry the SR information. Specifically, the step 101 may include:

when the SR information to be transmitted by the UE collides with the information on the PUCCH, performing, by the UE, phase rotation on a symbol at a DMRS position of the PUCCH, which is closest to a subsequent appearance position of the SR information;

using, by the UE, the phase-rotated symbol at the DMRS position to carry the SR information;

transmitting, by the UE, the information on the PUCCH, and simultaneously transmitting the SR information carried by the phase-rotated symbol at the DMRS position.

In this way, by simultaneously transmitting the information on the PUCCH and the SR information, PUCCH transmission can be guaranteed while guaranteeing transmission of the scheduling request.

One manner in which the UE performs phase rotation may be that: the UE multiplies the symbol at the DMRS position by a predefined phase rotation factor, thereby performing phase rotation on the symbol at the DMRS position. The predefined phase rotation factor is a predefined constant, for example $e^{\pi i/2}=i$.

For example, UE1 triggers SR when transmitting the PUCCH1, and the PUCCH1 includes two columns of DMRS. When a DMRS position of the PUCCH1, which is closest to a subsequent appearance position of the SR information, is corresponding to DMRS in the second column, the SR information collides with information of the DMRS in the second column. As shown in FIG. 2A, the UE1 performs phase rotation on the symbol at the position of DMRS in the second column, i.e., multiplying $e^{-\pi i}$, the UE1 triggers the SR when transmitting the PUCCH2, and the PUCCH2 includes four columns of DMRS. When a DMRS position of the PUCCH2, which is closest to a subsequent appearance position of the SR information, is corresponding to DMRS in the third column, the SR information collides with information prior to the DMRS in the third column. As shown in FIG. 2B, the UE1 performs phase rotation on the symbol at the position of DMRS in the third column, i.e., multiplying $e^{-\pi i}$, When a DMRS position of the PUCCH2, which is closest to a subsequent appearance position of the SR information, is corresponding to DMRS in the fourth column, the SR information collides with information of the DMRS in the fourth column. As shown in FIG. 2C, the UE1 performs phase rotation on the symbol at the position of DMRS in the fourth column, i.e., multiplying $e^{-\pi i}$.

It should be noted that the predefined phase rotation factor in this embodiment cannot be −1, because: DMRS in the first column of the PUCCH is the reference for determining the phase rotation of DMRS in the following columns, this embodiment allows modulating DMRS in the first column with the phase rotation related to SR, if phase rotation is performed on the symbol at the position of DMRS in the first column with −1, then subsequently, the network device cannot determine whether the SR information appears in the position of DMRS in the first column or in the position of DMRS in the next column. When the predefined phase rotation factor is not −1, but is i, for example, as shown in table 3, the network device can determine the appearance position of the SR information through relative phase deflection of DMRS in two columns including previous column and next column, i.e., phase difference of the next column relative to the previous column.

TABLE 3

| | DMRS in previous column | DMRS in next column | phase difference of next column relative to previous column |
|---|---|---|---|
| SR information in DMRS in previous column | $S * e^{\pi i/2}$ | S | −90° |
| SR information in DMRS in next column | S | $S * e^{\pi i/2}$ | +90° |

In one embodiment of the present disclosure, with respect to whether a DMRS position of the PUCCH, which is closest to a subsequent appearance position of the SR information, is corresponding to DMRS in the first column of the PUCCH, the step 101 may further include:

when the SR information to be transmitted by the UE collides with the information on the PUCCH, if a DMRS position of the PUCCH, which is closest to a subsequent appearance position of the SR information, is corresponding to DMRS in the first column of the PUCCH, performing, by the UE, phase rotation on a symbol at a position of DMRS in one column next to the DMRS in the first column; where the phase rotation may be performed by multiplying the symbol at the position of DMRS in the next column by the predefined phase rotation factor, and this predefined phase rotation factor may be −1, i, etc.;

using, by the UE, the phase-rotated symbol at the position of DMRS in the next column to carry the SR information;

transmitting, by the UE, the information on the PUCCH, and simultaneously transmitting the SR information carried by the phase-rotated symbol at the position of DMRS in the next column.

For example, UE2 triggers SR when transmitting PUCCH3, and the PUCCH3 includes four columns of DMRS. When a DMRS position of the PUCCH3, which is closest to a subsequent appearance position of the SR information, is corresponding to DMRS in the first column, the SR information collides with UCI prior to DMRS in the first column. As shown in FIG. 3, the UE2 performs phase rotation on the symbol at the position of DMRS in the second column, i.e., multiplying $e^{-\pi i}$.

In one embodiment of the present disclosure, when the SR information to be transmitted by the UE collides with the information on the PUCCH, the UE may simultaneously transmit the SR information and the information on the PUCCH by puncturing the PUCCH, thereby ensuring transmission of the PUCCH as well as the scheduling request. Specifically, the step 101 may include:

performing, by the UE, a puncturing process on the PUCCH, according to a collision situation between the SR information and the information on the PUCCH;

transmitting, by the UE, information on the punctured PUCCH, and simultaneously transmitting the SR information at a puncturing position of the PUCCH.

One manner in which the UE performs the puncturing process on the PUCCH according to the collision situation between the SR information and the information on the PUCCH may include:

when the SR information collides with UCI on the PUCCH, puncturing a symbol corresponding to the UCI, for transmitting the SR information; or, when the SR information collides with DMRS on the PUCCH, puncturing a symbol of UCI next to a symbol corresponding to the DMRS, for transmitting the SR information.

In this way, by simultaneously transmitting the information on the PUCCH and the SR information through puncturing, PUCCH transmission can be guaranteed while guaranteeing transmission of the scheduling request.

As shown in FIG. 4, one embodiment of the present disclosure further provides an information transmission method, which is applied to a network device, and includes the following steps.

Step 401: when collision between SR information to be transmitted by a UE and information on PUCCH occurs, receiving the SR information and/or the information on PUCCH transmitted by the UE.

In the information transmission method of the embodiment of the present disclosure, when collision between the SR information to be transmitted by the UE and information on PUCCH occurs, the network device receives the SR information and/or the information on PUCCH transmitted by the UE, thereby solving the collision problem occurring when the SR information and the information on the PUCCH are simultaneously transmitted, and clearly defining how the UE transmits information when the SR information collides with the information on the PUCCH.

In one embodiment of the present disclosure, receiving the SR information and/or the information on PUCCH transmitted by the UE, includes:

receiving the SR information or the information on PUCCH transmitted by the UE according to a predetermined criterion, status information of the PUCCH and/or service type corresponding to the SR.

Optionally, the status information of the PUCCH may include one or more of the following information: content carried by the PUCCH, payload size of the PUCCH, PUCCH format, and symbol length of the PUCCH.

Optionally, when the status information of the PUCCH includes the content carried by the PUCCH, the predetermined criterion may include:

when the content carried by the PUCCH includes ACK/NACK information, transmitting the information on the PUCCH; or, when the content carried by the PUCCH does not include ACK/NACK information, transmitting the SR information.

In the embodiment of the present disclosure, before receiving the SR information and/or the information on the PUCCH transmitted by the UE, the method further includes: transmitting configuration signaling to the UE.

The receiving the SR information and/or the information on the PUCCH transmitted by the UE, includes:

receiving the SR information and/or the information on the PUCCH transmitted by the UE according to the configuration signaling; where the configuration signaling is used to instruct the UE to transmit the SR information or the information on the PUCCH when the SR information to be transmitted by the UE collides with the information on the PUCCH.

Optionally, the configuration signaling may be specifically used to instruct the UE to:

when the PUCCH is in long PUCCH format and carries information which is less than or equal to 2 bits, transmit the SR information or the information on the PUCCH; and/or, when the PUCCH is in short PUCCH format and carries information which is greater than 2 bits, transmit the SR information or the information on the PUCCH; and/or, when the PUCCH is in long PUCCH format and carries information which is greater than 2 bits and less than or equal to N bits, transmit the SR information or the information on the PUCCH; and/or, when the PUCCH is in long PUCCH format and carries information which is greater than N bits, transmit the SR information or the information on the PUCCH;

where N is a positive integer greater than 2.

Optionally, the configuration signaling may be one or multiple signalings. Each of the multiple signalings may correspond to at least one configuration.

In the embodiment of the present disclosure, the receiving the SR information and/or the information on the PUCCH transmitted by the UE, includes:

receiving the information on the PUCCH, and the SR information carried by a phase-rotated symbol at a DMRS position of the PUCCH, which is closest to a subsequent appearance position of the SR information, where the information on the PUCCH and the SR information are simultaneously transmitted by the UE.

In the embodiment of the present disclosure, the receiving the SR information and/or the information on the PUCCH transmitted by the UE, includes:

receiving the information on the PUCCH, and the SR information carried by a phase-rotated symbol at a position of DMRS in one column next to DMRS in the first column of the PUCCH, where the information on the PUCCH and the SR information are simultaneously transmitted by the UE;

where a DMRS position of the PUCCH, which is closest to a subsequent appearance position of the SR information, is corresponding to DMRS in the first column of the PUCCH.

Optionally, the PUCCH is in a long PUCCH format and carries information greater than 2 bits.

In the embodiment of the present disclosure, the receiving the SR information and/or the information on the PUCCH transmitted by the UE, includes:

receiving information on the punctured PUCCH and the SR information transmitted at a puncturing position of the PUCCH, which are simultaneously transmitted by the UE;

where the UE performs a puncturing process on the PUCCH according to a collision situation between the SR information and the information on the PUCCH.

The above embodiments describe the information transmission method of the present disclosure, and the UE and the network device corresponding to the information transmission method of the present disclosure will be described hereinafter with reference to the embodiments and the accompanying drawings.

Referring to FIG. 5, one embodiment of the present disclosure further provides a user equipment (UE). The UE includes a transmission module 51, which is described in detail below.

The transmission module 51 is used to, when collision between SR information to be transmitted by the UE and information on PUCCH occurs, transmit the SR information and/or the information on PUCCH.

In the UE of the embodiment of the present disclosure, when collision between the SR information to be transmitted by the UE and information on PUCCH occurs, the UE transmits the SR information and/or the information on PUCCH, thereby solving the collision problem occurring when the SR information and the information on the PUCCH are simultaneously transmitted, and clearly defining how the UE transmits information when the SR information collides with the information on the PUCCH.

In one embodiment of the present disclosure, the transmission module 51 is specifically used to: transmit the SR information or the information on PUCCH, according to a predetermined criterion, status information of the PUCCH and/or service type corresponding to the SR.

Optionally, the status information of the PUCCH may include one or more of the following information: content carried by the PUCCH, payload size of the PUCCH, PUCCH format, and symbol length of the PUCCH.

Optionally, when the status information of the PUCCH includes the content carried by the PUCCH, the predetermined criterion may include:

when the content carried by the PUCCH includes ACK/NACK information, transmitting the information on the PUCCH; or, when the content carried by the PUCCH does not include ACK/NACK information, transmitting the SR information.

In one embodiment of the present disclosure, the transmission module 51 is specifically used to:

transmit the SR information or the information on PUCCH, according to a configuration signaling transmitted by the network device; where the configuration signaling is used to instruct the UE to transmit the SR information or the information on the PUCCH when the SR information to be transmitted by the UE collides with the information on the PUCCH.

Optionally, the configuration signaling may be specifically used to instruct the UE to:

when the PUCCH is in long PUCCH format and carries information which is less than or equal to 2 bits, transmit the SR information or the information on the PUCCH; and/or, when the PUCCH is in short PUCCH format and carries information which is greater than 2 bits, transmit the SR information or the information on the PUCCH; and/or, when the PUCCH is in long PUCCH format and carries information which is greater than 2 bits and less than or equal to N bits, transmit the SR information or the information on the PUCCH; and/or, when the PUCCH is in long PUCCH format and carries information which is greater than N bits, transmit the SR information or the information on the PUCCH;

where N is a positive integer greater than 2.

Optionally, the configuration signaling may be one or multiple signalings. Each of the multiple signalings may correspond to at least one configuration.

Figure 6:
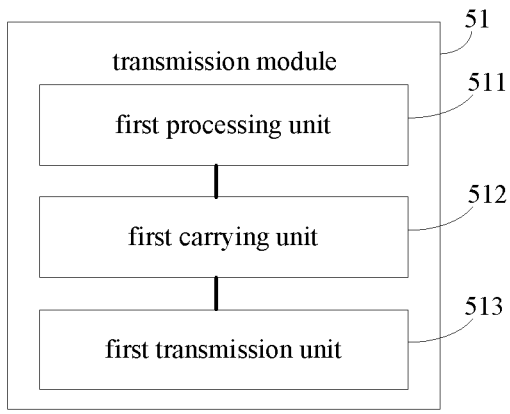
FIG. 6 is a second schematic diagram of a user equipment according to an embodiment of the present disclosure.

In one embodiment of the present disclosure, as shown in FIG. 6, the transmission module 51 may include a first processing unit 511, a first carrying unit 512, and a first transmission unit 513.

The first processing unit 511 is used to perform phase rotation on a symbol at a DMRS position of the PUCCH, which is closest to a subsequent appearance position of the SR information.

The first carrying unit 512 is used to enable the phase-rotated symbol at the DMRS position to carry the SR information.

The first transmission unit 513 is used to transmit the information on the PUCCH, and simultaneously transmit the SR information carried by the phase-rotated symbol at the DMRS position.

Optionally, the first processing unit is specifically used to multiply the symbol at the DMRS position by a predefined phase rotation factor, thereby performing phase rotation on the symbol at the DMRS position.

Figure 7:
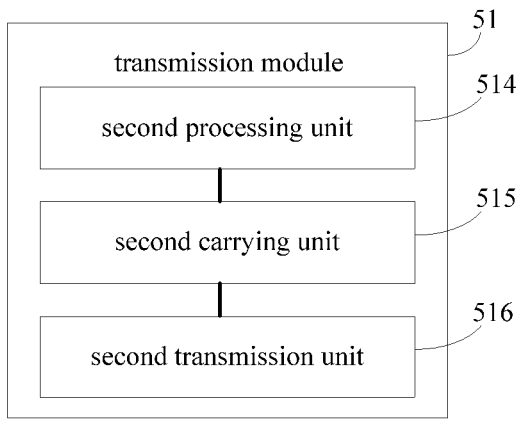
FIG. 7 is a third schematic diagram of a user equipment according to an embodiment of the present disclosure.

In one embodiment of the present disclosure, as shown in FIG. 7, the transmission module 51 may include a second processing unit 514, a second carrying unit 515 and a second transmission unit 516.

The second processing unit 514 is used to, when a DMRS position of the PUCCH, which is closest to a subsequent appearance position of the SR information, is corresponding to DMRS in the first column of the PUCCH, perform phase rotation on a symbol at a position of DMRS in one column next to the DMRS in the first column.

The second carrying unit 515 is used to enable the phase-rotated symbol at the position of DMRS in the next column to carry the SR information.

The second transmission unit 516 is used to transmit the information on the PUCCH, and simultaneously transmit the SR information carried by the phase-rotated symbol at the position of DMRS in the next column.

Optionally, the PUCCH is in a long PUCCH format and carries information greater than 2 bits.

Figure 8:
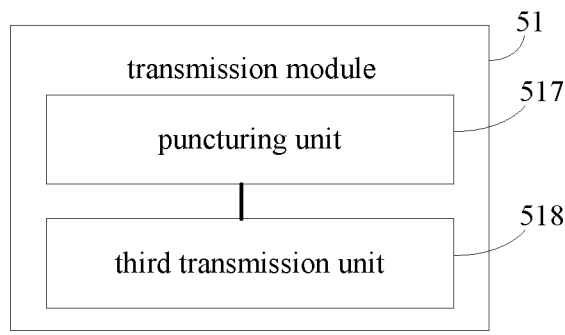
FIG. 8 is a fourth schematic diagram of a user equipment according to an embodiment of the present disclosure.

In one embodiment of the present disclosure, as shown in FIG. 8, the transmission module 51 may include a puncturing unit 517 and a third transmission unit 518.

The puncturing unit 517 is used to perform a puncturing process on the PUCCH, according to a collision situation between the SR information and the information on the PUCCH.

The third transmission unit 518 is used to transmit information on the punctured PUCCH, and simultaneously transmit the SR information at a puncturing position of the PUCCH.

Optionally, the puncturing unit 517 is specifically used to:

when the SR information collides with UCI on the PUCCH, puncture a symbol corresponding to the UCI, for transmitting the SR information; or, when the SR information collides with DMRS on the PUCCH, puncture a symbol of UCI next to a symbol corresponding to the DMRS, for transmitting the SR information.

Figure 9:
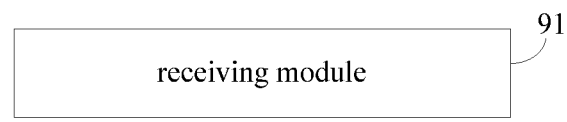
FIG. 9 is a first schematic diagram of a network device according to an embodiment of the present disclosure.

As shown in FIG. 9, one embodiment of the present disclosure further provides a network device. The network device includes a receiving module 91, which is described in detail below.

The receiving module 91 is used to, when collision between SR information to be transmitted by a UE and information on PUCCH occurs, receive the SR information and/or the information on PUCCH transmitted by the UE.

In the network device of the embodiment of the present disclosure, when collision between the SR information to be transmitted by the UE and information on PUCCH occurs, the network device receives the SR information and/or the information on PUCCH transmitted by the UE, thereby solving the collision problem occurring when the SR information and the information on the PUCCH are simultaneously transmitted, and clearly defining how the UE transmits information when the SR information collides with the information on the PUCCH.

In one embodiment of the present disclosure, the receiving module 91 is specifically used to receive the SR information or the information on PUCCH transmitted by the UE according to a predetermined criterion, status information of the PUCCH and/or service type corresponding to the SR.

Optionally, the status information of the PUCCH may include one or more of the following information: content carried by the PUCCH, payload size of the PUCCH, PUCCH format, and symbol length of the PUCCH.

Optionally, when the status information of the PUCCH includes the content carried by the PUCCH, the predetermined criterion may include:

when the content carried by the PUCCH includes ACK/NACK information, transmitting the information on the PUCCH; or, when the content carried by the PUCCH does not include ACK/NACK information, transmitting the SR information.

In one embodiment of the disclosure, the network device further includes a transmission module.

The transmission module is used to transmit configuration signaling to the UE.

The receiving module 91 is specifically used to:

receive the SR information and/or the information on the PUCCH transmitted by the UE according to the configuration signaling; where the configuration signaling is used to instruct the UE to transmit the SR information or the information on the PUCCH when the SR information to be transmitted by the UE collides with the information on the PUCCH.

Optionally, the configuration signaling may be specifically used to instruct the UE to:

when the PUCCH is in long PUCCH format and carries information which is less than or equal to 2 bits, transmit the SR information or the information on the PUCCH; and/or, when the PUCCH is in short PUCCH format and carries information which is greater than 2 bits, transmit the SR information or the information on the PUCCH; and/or, when the PUCCH is in long PUCCH format and carries information which is greater than 2 bits and less than or equal to N bits, transmit the SR information or the information on the PUCCH; and/or, when the PUCCH is in long PUCCH format and carries information which is greater than N bits, transmit the SR information or the information on the PUCCH;

where N is a positive integer greater than 2.

Optionally, the configuration signaling may be one or multiple signalings. Each of the multiple signalings may correspond to at least one configuration.

In one embodiment of the present disclosure, the receiving module 91 is specifically used to:

receive the information on the PUCCH, and the SR information carried by a phase-rotated symbol at a DMRS position of the PUCCH, which is closest to a subsequent appearance position of the SR information, where the information on the PUCCH and the SR information are simultaneously transmitted by the UE.

In one embodiment of the present disclosure, the receiving module 91 is specifically used to:

receive the information on the PUCCH, and the SR information carried by a phase-rotated symbol at a position of DMRS in one column next to DMRS in the first column of the PUCCH, where the information on the PUCCH and the SR information are simultaneously transmitted by the UE;

where a DMRS position of the PUCCH, which is closest to a subsequent appearance position of the SR information, is corresponding to DMRS in the first column of the PUCCH.

Optionally, the PUCCH is in a long PUCCH format and carries information greater than 2 bits.

In one embodiment of the present disclosure, the receiving module 91 is specifically used to:

receive information on the punctured PUCCH and the SR information transmitted at a puncturing position of the PUCCH, which are simultaneously transmitted by the UE;

where the UE performs a puncturing process on the PUCCH according to a collision situation between the SR information and the information on the PUCCH.

One embodiment of the present disclosure further provides a user equipment (UE), including a processor, a memory, a computer program stored on the memory and executable on the processor. The computer program is executed by the processor to implement procedures of the information transmission method of the above embodiment with the same technical effect achieved, which will not elaborated herein.

Figure 10:
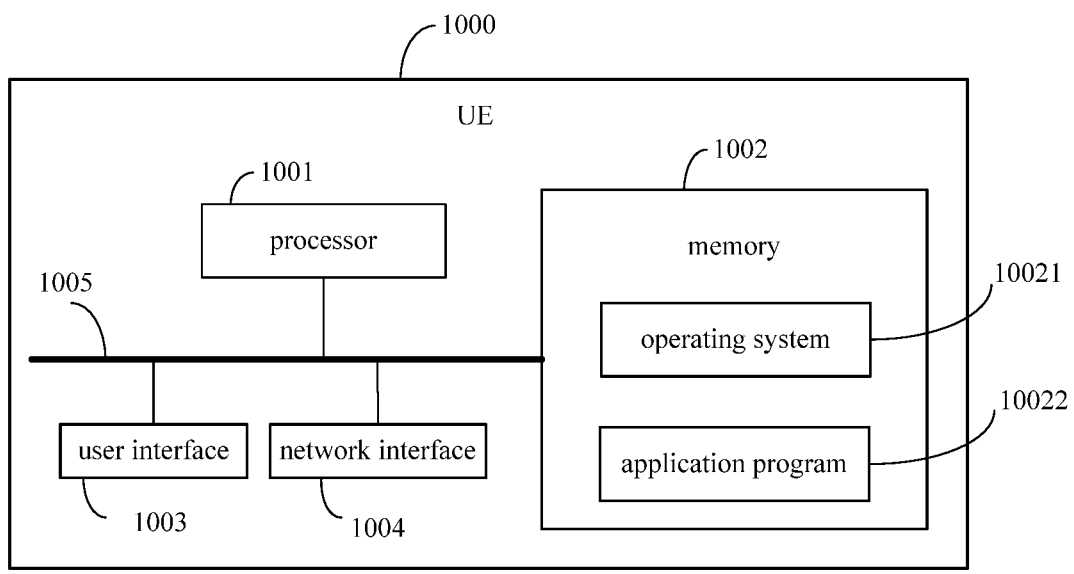
FIG. 10 is a fifth schematic diagram of a user equipment according to an embodiment of the present disclosure.

Specifically, FIG. 10 is a block diagram of a UE according to an embodiment of the present disclosure. The UE 1000 shown in FIG. 10 includes at least one processor 1001, a memory 1002, a user interface 1003 and at least one network interface 1004. Each component in the UE 1000 is coupled together via a bus system 1005. It can be understood that the bus system 1005 is configured to implement the connection and communication among the components. The bus system 1005 includes a power bus, control bus, state signal bus besides a data bus. For the clarity of description, each bus in FIG. 10 is denoted as the bus system 1005.

The user interface 1003 may include a monitor, keyboard, or clickable device (for example, a mouse, track ball), touchpad, or touch screen.

It can be understood that the memory 1002 in embodiments of the present disclosure may be a volatile storage or a nonvolatile storage, or both the volatile storage and non-volatile storage. The nonvolatile storage may be Read Only Memory (ROM), Programmable Read-Only Memory (PROM), Erasable Programmable Read-Only Memory (EPROM), Electrically Erasable Programmable Read-Only Memory (EEPROM) or flash. The volatile storage may be a Random Access Memory (RAM), which is used as an external cache. As an illustrative but not restrictive specification, many forms of RAMs are available, such as Static RAM (SRAM), Dynamic RAM (DRAM), Synchronous DRAM (SDRAM), Double Data Rate SDRAM (DDRSDRAM), Enhanced SDRAM (ESDRAM), Synchronization Link DRAM (SLDRAM) and Direct Rambus RAM (DRRAM). The memory 1002 in the system and method described in embodiments of the present disclosure include, but is not limited to, these and any other suitable types of storages.

In some embodiments, the memory 1002 stores following elements, such as executable modules, data structure, subset thereof, or superset thereof: operating system 10021 and an application program 10022.

The operating system 10021 includes various kinds of system programs, such as a framework layer, a core library layer and a driver layer, which are used to implement various kinds of basic services and process hardware-based tasks. The application program 10022 includes various kinds of application programs, such as Media Player and Browser, which are used to implement various kinds of application services. Programs, which are used to implement the methods in embodiments of the present disclosure, may be included in the application program 10022.

In an embodiment of the present disclosure, the UE 1000 further includes a computer program which is stored on the memory 1002 and executable on the processor 1001. The computer program is executed by the processor 1001 to implement the following steps: when collision between SR information to be transmitted by the UE and information on PUCCH occurs, transmitting the SR information and/or the information on PUCCH.

The methods in the above embodiments of the present disclosure may be applied to or implemented by the processor 1001. The processor 1001 may be an integrated circuit chip with signal processing capability. In the implementation process, each step of the above method can be completed by the integrated logic circuit of the hardware in processor 1001 or the instructions in the form of software. The processor 1001 mentioned above may be a general purpose processor, Digital Signal Processor (DSP), Application Specific Integrated Circuit (ASIC), Field Programmable Gate Array (FPGA) or other Programmable logic device, discrete Gate or transistor logic device, discrete hardware component. Methods, steps and logical block diagrams disclosed in embodiments of the present disclosure may be realized or implemented. A general-purpose processor can be a microprocessor or the general-purpose processor can be any regular processor, etc. The steps in combination with the method disclosed in embodiments of the present disclosure may be directly embodied as the execution of the hardware decoding processor or by a combination of hardware and software modules in the decoding processor. Software modules can be located in random access memory, flash memory, read only memory, programmable read only memory or electrically-erasable programmable memory, register and other mature computer readable storage media in this field. The storage medium is located in the memory 1002, and the processor 1001 reads the information in the memory 1002 to implement steps in the above method in combination with the hardware.

It can be understood that these embodiments described in the present disclosure may be implemented with hardware, software, firmware, middleware, microcode, or a combination thereof. As for hardware implementation, the processing unit can be implemented in one or multiple Application-Specific Integrated Circuits (ASIC), Digital Signal Processors (DSP), Digital Signal Processing Devices (DSPD), Programmable Logic Devices (PLD), Field-Programmable Gate Arrays (FPGA), general-purpose processors, controllers, micro-controllers, micro-processors, and other electronic units or combinations thereof used to perform the functions described in the present disclosure.

For software implementations, the technologies described in the present disclosure can be implemented through the modules that perform the functions described in the present disclosure (such as procedures, functions, and so on). Software codes can be stored in the storage and executed by the processor. The storage can be implemented in or outside of the processor.

Optionally, the computer program is executed by the processor 1001 to implement the following steps: transmitting the SR information or the information on PUCCH, according to a predetermined criterion, status information of the PUCCH and/or service type corresponding to the SR.

Optionally, the status information of the PUCCH may include one or more of the following information: content carried by the PUCCH, payload size of the PUCCH, PUCCH format, and symbol length of the PUCCH.

Optionally, when the status information of the PUCCH includes the content carried by the PUCCH, the predetermined criterion may include: when the content carried by the PUCCH includes ACK/NACK information, transmitting the information on the PUCCH; or, when the content carried by the PUCCH does not include ACK/NACK information, transmitting the SR information.

Optionally, the computer program is executed by the processor 1001 to implement the following steps: transmitting the SR information or the information on PUCCH, according to a configuration signaling transmitted by the network device; where the configuration signaling is used to instruct the UE to transmit the SR information or the information on the PUCCH when the SR information to be transmitted by the UE collides with the information on the PUCCH.

Optionally, the configuration signaling may be specifically used to instruct the UE to:

when the PUCCH is in long PUCCH format and carries information which is less than or equal to 2 bits, transmit the SR information or the information on the PUCCH; and/or, when the PUCCH is in short PUCCH format and carries information which is greater than 2 bits, transmit the SR information or the information on the PUCCH; and/or, when the PUCCH is in long PUCCH format and carries information which is greater than 2 bits and less than or equal to N bits, transmit the SR information or the information on the PUCCH; and/or, when the PUCCH is in long PUCCH format and carries information which is greater than N bits, transmit the SR information or the information on the PUCCH;

where N is a positive integer greater than 2.

Optionally, the configuration signaling may be one or multiple signalings. Each of the multiple signalings may correspond to at least one configuration.

Optionally, the computer program is executed by the processor 1001 to implement the following steps: performing phase rotation on a symbol at a DMRS position of the PUCCH, which is closest to a subsequent appearance position of the SR information; using the phase-rotated symbol at the DMRS position to carry the SR information; transmitting the information on the PUCCH, and simultaneously transmitting the SR information carried by the phase-rotated symbol at the DMRS position.

Optionally, the computer program is executed by the processor 1001 to implement the following steps: multiplying the symbol at the DMRS position by a predefined phase rotation factor, thereby performing phase rotation on the symbol at the DMRS position.

Optionally, the computer program is executed by the processor 1001 to implement the following steps: when a DMRS position of the PUCCH, which is closest to a subsequent appearance position of the SR information, is corresponding to DMRS in the first column of the PUCCH, performing phase rotation on a symbol at a position of DMRS in one column next to the DMRS in the first column; using the phase-rotated symbol at the position of DMRS in the next column to carry the SR information; transmitting the information on the PUCCH, and simultaneously transmitting the SR information carried by the phase-rotated symbol at the position of DMRS in the next column Optionally, the PUCCH is in a long PUCCH format and carries information greater than 2 bits.

Optionally, the computer program is executed by the processor 1001 to implement the following steps: performing a puncturing process on the PUCCH, according to a collision situation between the SR information and the information on the PUCCH; transmitting information on the punctured PUCCH, and simultaneously transmitting the SR information at a puncturing position of the PUCCH.

Optionally, the computer program is executed by the processor 1001 to implement the following steps: when the SR information collides with UCI on the PUCCH, puncturing a symbol corresponding to the UCI, for transmitting the SR information; or, when the SR information collides with DMRS on the PUCCH, puncturing a symbol of UCI next to a symbol corresponding to the DMRS, for transmitting the SR information.

The UE 1000 can implement various procedures implemented by the UE in the foregoing embodiment, which will not be elaborated herein.

The UE 1000 of the embodiment of the present disclosure transmits the SR information and/or the information on PUCCH when collision between the SR information to be transmitted by the UE and information on PUCCH occurs, thereby solving the collision problem occurring when the SR information and the information on the PUCCH are simultaneously transmitted, and clearly defining how the UE transmits information when the SR information collides with the information on the PUCCH.

Figure 11:
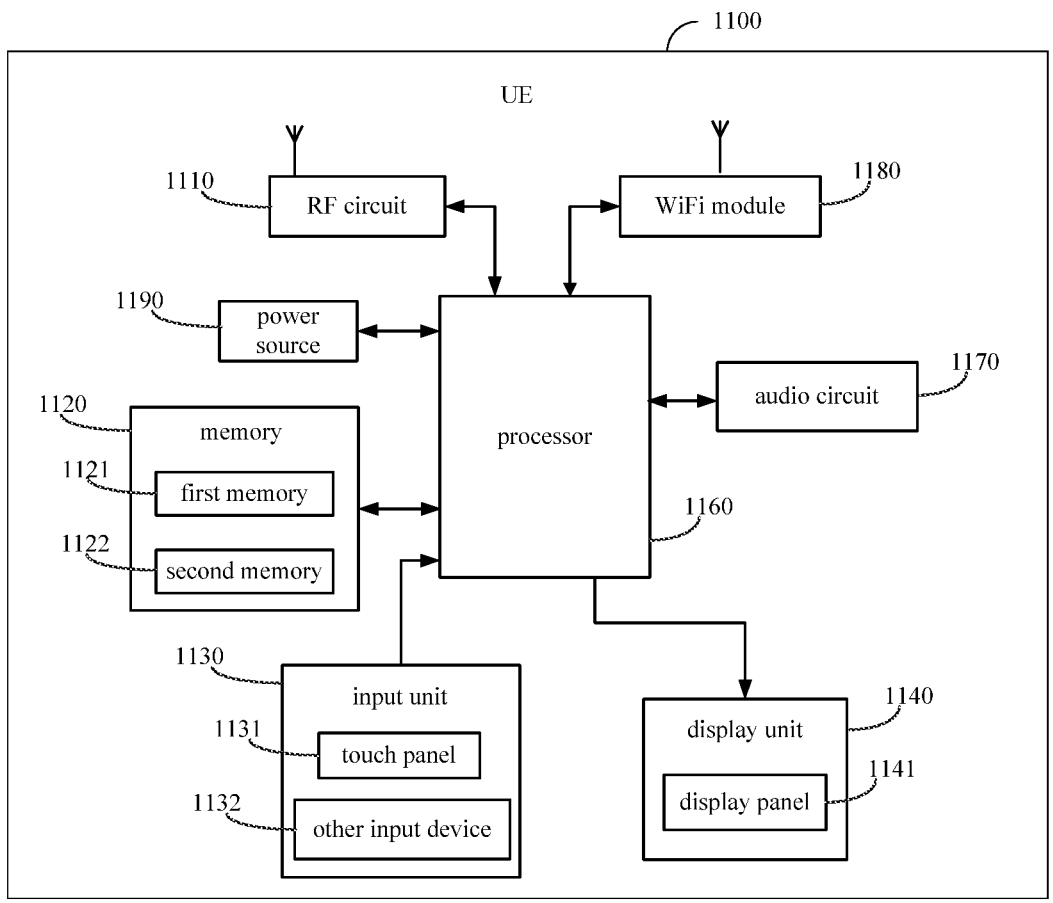
FIG. 11 is a sixth schematic diagram of a user equipment according to an embodiment of the present disclosure.

FIG. 11 is a block diagram of a UE according to another embodiment of the present disclosure. Specifically, the UE 1100 in FIG. 11 may be a mobile phone, a tablet computer, a personal digital assistant (PDA) or an in-vehicle computer.

The UE 1100 shown in FIG. 11 includes a Radio Frequency (RF) circuit 1110, a memory 1120, an input unit 1130, a display unit 1140, a processor 1160, an audio circuit 1170, a Wireless Fidelity (WIFI) module 1180 and a power source 1190.

The input unit 1130 may be configured to receive information inputted by a user, and generate an input of signal, which is relevant with user settings and function control of the UE 1100. Specifically, in the embodiment of the present disclosure, the input unit 1130 may include a touch panel 1131. The touch panel 1131, also referred to as touch screen, may collect touch operations of the user on or around the touch screen (e.g., a user's operations on the touch panel 1131 by using a finger, a touch pen, or any appropriate object or attachment), and drive a corresponding connection device, based on a preset program. Optionally, the touch panel 1131 may include two parts, e.g., a touch detecting device, and a touch controller. The touch detecting device is configured to detect a touch direction of a user, detect a signal from a touch operation, and transmit the signal to the touch controller. The touch controller is configured to receive touch information from the touch detecting device, convert the touch information to contact coordinates, transmit the contact coordinates to the processor 1160, receive and execute a command from the processor 1160. In addition, the touch panel 1131 may be implemented by various types, such as, resistive, capacitive, infrared, and surface acoustic waves. In addition to the touch panel 1131, the input unit 1130 may also include other input device 1132, which may include, but is not limited to, one or more of a physical keyboard, function keys (such as volume control buttons, switch buttons, etc.), trackball, mouse, joystick, and the like.

The display unit 1140 may be configured to display information inputted by the user, or information provided for the user, and various menu interfaces of the UE 1100. The display unit 1140 may include a display panel 1141. Optionally, the display panel 1141 may be configured by using LCD, or Organic Light-Emitting Diode (OLED).

It should be noted that, the touch panel 1131 may cover the display panel 1141 to form a touch display. When the touch display detects a touch operation on, or around it, the touch display transmits to the processor 1160, so as to determine the type of the touch event. Subsequently, the processor 1160 provides a corresponding visual output on the touch display based on the type of the touch event.

The touch display includes an application interface display area and a common control display area. Arrangements of the application interface display area and common control display area are not limited, which may be two display areas, such as, up and down, left and right. The application interface display area may be configured to display an application interface. Each interface may include interface elements, such as, an icon of at least one application, and/or, widget desktop control, and so on. The application interface display area may also be an empty interface without any content. The common control display area is configured to display highly used controls, e.g., application icons, such as, a setting button, an interface number, a scroll bar, a phone book icon, and so on.

The processor 1160 is a control center of the UE 1100. The processor 1160 connects each part of the whole mobile phone, by using various interfaces and lines. The processor 1160 performs various functions of the UE 1100, and processes data, by running or executing software programs, and/or, modules in the first memory 1121, and calls data in the second memory 1122, so as to perform an overall monitor on the UE 1100. Optionally, the processor 1160 may include one or more processing units.

In an embodiment of the present disclosure, the UE 1100 further includes a computer program which is stored on the memory 1120 and executable on the processor 1160. The computer program is executed by the processor 1160 to implement the following steps: when collision between SR information to be transmitted by the UE and information on PUCCH occurs, transmitting the SR information and/or the information on PUCCH.

Optionally, the computer program is executed by the processor 1160 to implement the following steps: transmitting the SR information or the information on PUCCH, according to a predetermined criterion, status information of the PUCCH and/or service type corresponding to the SR.

Optionally, the status information of the PUCCH may include one or more of the following information: content carried by the PUCCH, payload size of the PUCCH, PUCCH format, and symbol length of the PUCCH.

Optionally, when the status information of the PUCCH includes the content carried by the PUCCH, the predetermined criterion may include: when the content carried by the PUCCH includes ACK/NACK information, transmitting the information on the PUCCH; or, when the content carried by the PUCCH does not include ACK/NACK information, transmitting the SR information.

Optionally, the computer program is executed by the processor 1160 to implement the following steps: transmitting the SR information or the information on PUCCH, according to a configuration signaling transmitted by the network device; where the configuration signaling is used to instruct the UE to transmit the SR information or the information on the PUCCH when the SR information to be transmitted by the UE collides with the information on the PUCCH.

Optionally, the configuration signaling may be specifically used to instruct the UE to:

when the PUCCH is in long PUCCH format and carries information which is less than or equal to 2 bits, transmit the SR information or the information on the PUCCH; and/or, when the PUCCH is in short PUCCH format and carries information which is greater than 2 bits, transmit the SR information or the information on the PUCCH; and/or, when the PUCCH is in long PUCCH format and carries information which is greater than 2 bits and less than or equal to N bits, transmit the SR information or the information on the PUCCH; and/or, when the PUCCH is in long PUCCH format and carries information which is greater than N bits, transmit the SR information or the information on the PUCCH;

where N is a positive integer greater than 2.

Optionally, the configuration signaling may be one or multiple signalings. Each of the multiple signalings may correspond to at least one configuration.

Optionally, the computer program is executed by the processor 1160 to implement the following steps: performing phase rotation on a symbol at a DMRS position of the PUCCH, which is closest to a subsequent appearance position of the SR information; using the phase-rotated symbol at the DMRS position to carry the SR information; transmitting the information on the PUCCH, and simultaneously transmitting the SR information carried by the phase-rotated symbol at the DMRS position.

Optionally, the computer program is executed by the processor 1160 to implement the following steps: multiplying the symbol at the DMRS position by a predefined phase rotation factor, thereby performing phase rotation on the symbol at the DMRS position.

Optionally, the computer program is executed by the processor 1160 to implement the following steps: when a DMRS position of the PUCCH, which is closest to a subsequent appearance position of the SR information, is corresponding to DMRS in the first column of the PUCCH, performing phase rotation on a symbol at a position of DMRS in one column next to the DMRS in the first column; using the phase-rotated symbol at the position of DMRS in the next column to carry the SR information; transmitting the information on the PUCCH, and simultaneously transmitting the SR information carried by the phase-rotated symbol at the position of DMRS in the next column Optionally, the PUCCH is in a long PUCCH format and carries information greater than 2 bits.

Optionally, the computer program is executed by the processor 1160 to implement the following steps: performing a puncturing process on the PUCCH, according to a collision situation between the SR information and the information on the PUCCH; transmitting information on the punctured PUCCH, and simultaneously transmitting the SR information at a puncturing position of the PUCCH.

Optionally, the computer program is executed by the processor 1160 to implement the following steps: when the SR information collides with UCI on the PUCCH, puncturing a symbol corresponding to the UCI, for transmitting the SR information; or, when the SR information collides with DMRS on the PUCCH, puncturing a symbol of UCI next to a symbol corresponding to the DMRS, for transmitting the SR information.

Thus, the UE 1100 of the embodiment of the present disclosure transmits the SR information and/or the information on PUCCH when collision between the SR information to be transmitted by the UE and information on PUCCH occurs, thereby solving the collision problem occurring when the SR information and the information on the PUCCH are simultaneously transmitted, and clearly defining how the UE transmits information when the SR information collides with the information on the PUCCH.

In addition, one embodiment of the present disclosure further provides a network device, including a processor, a memory, a computer program stored on the memory and executable on the processor. The computer program is executed by the processor to implement procedures of the information transmission method of the above embodiment with the same technical effect achieved, which will not elaborated herein.

Figure 12:
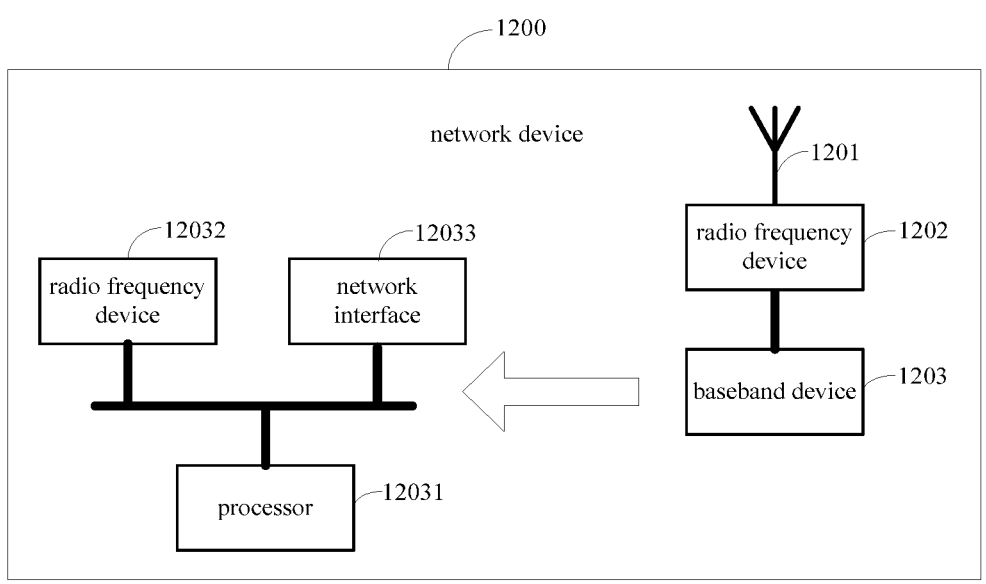
FIG. 12 is a second schematic diagram of a network device according to an embodiment of the present disclosure.

FIG. 12 is a block diagram of a network device according to an embodiment of the present disclosure. As shown in FIG. 12, the network device 1200 includes an antenna 1201, a radio frequency device 1202 and a baseband device 1203. The antenna 1201 is coupled with the radio frequency device 1202. In the uplink direction, the radio frequency device 1202 receives information through the antenna 1201, and transmits the received information to the baseband device 1203 for processing. In the downlink direction, the baseband device 1203 processes the information to be transmitted and transmits it to the radio frequency device 1202. The radio frequency device 1202 processes the received information and transmits it via the antenna 1201.

The baseband device 1203 includes a processor 12031 and a memory 12032. For example, the baseband device 103 may include at least one baseband board on which chips are disposed. As shown in FIG. 12, one of the chips is, for example, a processor 12031 coupled with the memory 12032 to call a program in the memory 12032 to execute operations of the network device in the above method embodiment.

The baseband device 1203 may further include a network interface 12033 for interacting with the radio frequency device 1202, such as a common public radio interface (CPRI).

The processor herein may be a processor or a collective name of multiple processing elements. For example, the processor may be a CPU, an ASIC, or one or more integrated circuits configured to implement the method performed by the above network device, such as one or more DSPs, or one or more field programmable gate arrays FPGAs. The memory may be a memory or a collective name for a plurality of storage elements.

The memory 12032 may be either volatile memory or non-volatile memory, or may include both volatile and non-volatile memories. The non-volatile memory may be a Read-Only Memory (ROM), a Programmable ROM (PROM), an Erasable PROM (EPROM), electrically EPROM (EEPROM) or flash memory. The volatile memory may be a Random Access Memory (RAM), which is used as an external cache. By way of example and not limitation, many forms of RAM are available, such as static RAM (SRAM), dynamic RAM (DRAM), synchronous DRAM (SDRAM), double data rate SDRAM (DDRSDRAM), enhanced SDRAM (ESDRAM), Synchlink DRAM (SLDRAM), Direct Rambus RAM (DRRAM). The memory 12032 described herein is intended to include, without being limited to, these and any other suitable types of memory.

Specifically, the processor 12031 calls the computer program in the memory 12032 to execute steps: when collision between SR information to be transmitted by a UE and information on PUCCH occurs, receiving the SR information and/or the information on PUCCH transmitted by the UE.

Optionally, the computer program is executed by the processor 12031 to implement the following steps: receiving the SR information or the information on PUCCH transmitted by the UE according to a predetermined criterion, status information of the PUCCH and/or service type corresponding to the SR.

Optionally, the status information of the PUCCH may include one or more of the following information: content carried by the PUCCH, payload size of the PUCCH, PUCCH format, and symbol length of the PUCCH.

Optionally, when the status information of the PUCCH includes the content carried by the PUCCH, the predetermined criterion may include: when the content carried by the PUCCH includes ACK/NACK information, transmitting the information on the PUCCH; or, when the content carried by the PUCCH does not include ACK/NACK information, transmitting the SR information.

Optionally, the computer program is executed by the processor 12031 to implement the following steps: transmitting configuration signaling to the UE; receiving the SR information and/or the information on the PUCCH transmitted by the UE according to the configuration signaling; where the configuration signaling is used to instruct the UE to transmit the SR information or the information on the PUCCH when the SR information to be transmitted by the UE collides with the information on the PUCCH.

Optionally, the configuration signaling may be specifically used to instruct the UE to:

when the PUCCH is in long PUCCH format and carries information which is less than or equal to 2 bits, transmit the SR information or the information on the PUCCH; and/or, when the PUCCH is in short PUCCH format and carries information which is greater than 2 bits, transmit the SR information or the information on the PUCCH; and/or, when the PUCCH is in long PUCCH format and carries information which is greater than 2 bits and less than or equal to N bits, transmit the SR information or the information on the PUCCH; and/or, when the PUCCH is in long PUCCH format and carries information which is greater than N bits, transmit the SR information or the information on the PUCCH;

where N is a positive integer greater than 2.

Optionally, the configuration signaling may be one or multiple signalings. Each of the multiple signalings may correspond to at least one configuration.

Optionally, the computer program is executed by the processor 12031 to implement the following steps: receiving the information on the PUCCH, and the SR information carried by a phase-rotated symbol at a DMRS position of the PUCCH, which is closest to a subsequent appearance position of the SR information, where the information on the PUCCH and the SR information are simultaneously transmitted by the UE.

Optionally, the computer program is executed by the processor 12031 to implement the following steps: receiving the information on the PUCCH, and the SR information carried by a phase-rotated symbol at a position of DMRS in one column next to DMRS in the first column of the PUCCH, where the information on the PUCCH and the SR information are simultaneously transmitted by the UE;

where a DMRS position of the PUCCH, which is closest to a subsequent appearance position of the SR information, is corresponding to DMRS in the first column of the PUCCH.

Optionally, the PUCCH is in a long PUCCH format and carries information greater than 2 bits.

Optionally, the computer program is executed by the processor 12031 to implement the following steps: receiving information on the punctured PUCCH and the SR information transmitted at a puncturing position of the PUCCH, which are simultaneously transmitted by the UE; where the UE performs a puncturing process on the PUCCH according to a collision situation between the SR information and the information on the PUCCH.

In this way, the network device of the embodiment of the present disclosure receives the SR information and/or the information on PUCCH transmitted by the UE when collision between the SR information to be transmitted by the UE and information on PUCCH occurs, thereby solving the collision problem occurring when the SR information and the information on the PUCCH are simultaneously transmitted, and clearly defining how the UE transmits information when the SR information collides with the information on the PUCCH.

One embodiment of the present disclosure provides a computer readable storage medium including a computer program stored thereon. The computer program is executed by a processor to implement procedures of the above information transmission method with the same technical effect achieved, which will not elaborated herein.

Specifically, when the computer readable storage medium is applied to the UE, the computer program is executed by the processor to implement the following steps: when collision between SR information to be transmitted by the UE and information on PUCCH occurs, transmitting the SR information and/or the information on PUCCH.

Optionally, the computer program is executed by the processor to implement the following steps: transmitting the SR information or the information on PUCCH, according to a predetermined criterion, status information of the PUCCH and/or service type corresponding to the SR.

Optionally, the status information of the PUCCH may include one or more of the following information: content carried by the PUCCH, payload size of the PUCCH, PUCCH format, and symbol length of the PUCCH.

Optionally, when the status information of the PUCCH includes the content carried by the PUCCH, the predetermined criterion may include: when the content carried by the PUCCH includes ACK/NACK information, transmitting the information on the PUCCH; or, when the content carried by the PUCCH does not include ACK/NACK information, transmitting the SR information.

Optionally, the computer program is executed by the processor to implement the following steps: transmitting the SR information or the information on PUCCH, according to a configuration signaling transmitted by the network device; where the configuration signaling is used to instruct the UE to transmit the SR information or the information on the PUCCH when the SR information to be transmitted by the UE collides with the information on the PUCCH.

Optionally, the configuration signaling may be specifically used to instruct the UE to:

when the PUCCH is in long PUCCH format and carries information which is less than or equal to 2 bits, transmit the SR information or the information on the PUCCH; and/or, when the PUCCH is in short PUCCH format and carries information which is greater than 2 bits, transmit the SR information or the information on the PUCCH; and/or, when the PUCCH is in long PUCCH format and carries information which is greater than 2 bits and less than or equal to N bits, transmit the SR information or the information on the PUCCH; and/or, when the PUCCH is in long PUCCH format and carries information which is greater than N bits, transmit the SR information or the information on the PUCCH;

where N is a positive integer greater than 2.

Optionally, the configuration signaling may be one or multiple signalings. Each of the multiple signalings may correspond to at least one configuration.

Optionally, the computer program is executed by the processor to implement the following steps: performing phase rotation on a symbol at a DMRS position of the PUCCH, which is closest to a subsequent appearance position of the SR information; using the phase-rotated symbol at the DMRS position to carry the SR information; transmitting the information on the PUCCH, and simultaneously transmitting the SR information carried by the phase-rotated symbol at the DMRS position.

Optionally, the computer program is executed by the processor to implement the following steps: multiplying the symbol at the DMRS position by a predefined phase rotation factor, thereby performing phase rotation on the symbol at the DMRS position.

Optionally, the computer program is executed by the processor to implement the following steps: when a DMRS position of the PUCCH, which is closest to a subsequent appearance position of the SR information, is corresponding to DMRS in the first column of the PUCCH, performing phase rotation on a symbol at a position of DMRS in one column next to the DMRS in the first column; using the phase-rotated symbol at the position of DMRS in the next column to carry the SR information; transmitting the information on the PUCCH, and simultaneously transmitting the SR information carried by the phase-rotated symbol at the position of DMRS in the next column Optionally, the PUCCH is in a long PUCCH format and carries information greater than 2 bits.

Optionally, the computer program is executed by the processor to implement the following steps: performing a puncturing process on the PUCCH, according to a collision situation between the SR information and the information on the PUCCH; transmitting information on the punctured PUCCH, and simultaneously transmitting the SR information at a puncturing position of the PUCCH.

Optionally, the computer program is executed by the processor to implement the following steps: when the SR information collides with UCI on the PUCCH, puncturing a symbol corresponding to the UCI, for transmitting the SR information; or, when the SR information collides with DMRS on the PUCCH, puncturing a symbol of UCI next to a symbol corresponding to the DMRS, for transmitting the SR information.

Specifically, when the computer readable storage medium is applied to the network device, the computer program is executed by the processor to implement the following steps: when collision between SR information to be transmitted by a UE and information on PUCCH occurs, receiving the SR information and/or the information on PUCCH transmitted by the UE.

Optionally, the computer program is executed by the processor to implement the following steps: receiving the SR information or the information on PUCCH transmitted by the UE according to a predetermined criterion, status information of the PUCCH and/or service type corresponding to the SR.

Optionally, the status information of the PUCCH may include one or more of the following information: content carried by the PUCCH, payload size of the PUCCH, PUCCH format, and symbol length of the PUCCH.

Optionally, when the status information of the PUCCH includes the content carried by the PUCCH, the predetermined criterion may include: when the content carried by the PUCCH includes ACK/NACK information, transmitting the information on the PUCCH; or, when the content carried by the PUCCH does not include ACK/NACK information, transmitting the SR information.

Optionally, the computer program is executed by the processor to implement the following steps: transmitting configuration signaling to the UE; receiving the SR information and/or the information on the PUCCH transmitted by the UE according to the configuration signaling; where the configuration signaling is used to instruct the UE to transmit the SR information or the information on the PUCCH when the SR information to be transmitted by the UE collides with the information on the PUCCH.

Optionally, the configuration signaling may be specifically used to instruct the UE to:

when the PUCCH is in long PUCCH format and carries information which is less than or equal to 2 bits, transmit the SR information or the information on the PUCCH; and/or, when the PUCCH is in short PUCCH format and carries information which is greater than 2 bits, transmit the SR information or the information on the PUCCH; and/or, when the PUCCH is in long PUCCH format and carries information which is greater than 2 bits and less than or equal to N bits, transmit the SR information or the information on the PUCCH; and/or, when the PUCCH is in long PUCCH format and carries information which is greater than N bits, transmit the SR information or the information on the PUCCH;

where N is a positive integer greater than 2.

Optionally, the configuration signaling may be one or multiple signalings. Each of the multiple signalings may correspond to at least one configuration.

Optionally, the computer program is executed by the processor to implement the following steps: receiving the information on the PUCCH, and the SR information carried by a phase-rotated symbol at a DMRS position of the PUCCH, which is closest to a subsequent appearance position of the SR information, where the information on the PUCCH and the SR information are simultaneously transmitted by the UE.

Optionally, the computer program is executed by the processor to implement the following steps: receiving the information on the PUCCH, and the SR information carried by a phase-rotated symbol at a position of DMRS in one column next to DMRS in the first column of the PUCCH, where the information on the PUCCH and the SR information are simultaneously transmitted by the UE;

where a DMRS position of the PUCCH, which is closest to a subsequent appearance position of the SR information, is corresponding to DMRS in the first column of the PUCCH.

Optionally, the PUCCH is in a long PUCCH format and carries information greater than 2 bits.

Optionally, the computer program is executed by the processor to implement the following steps: receiving information on the punctured PUCCH and the SR information transmitted at a puncturing position of the PUCCH, which are simultaneously transmitted by the UE; where the UE performs a puncturing process on the PUCCH according to a collision situation between the SR information and the information on the PUCCH.

The computer readable media may be permanent and non-persistent, removable and non-removable media, which can store information by any method or technology. The information may be computer-readable instructions, data structures, modules of a program, or other data. Examples of the computer storage media include, but are not limited to, phase change memory (PRAM), static random access memory (SRAM), dynamic random access memory (DRAM), other types of random access memory (RAM), and read-only memory (ROM), electrically erasable programmable read-only memory (EEPROM), flash memory or other memory technology, read-only disc read-only memory (CD-ROM), digital versatile disc (DVD) or other optical storage, magnetic tape cartridges, magnetic tape magnetic disk storage or other magnetic storage devices or any other non-transmission media which may be used to store information that can be accessed by computing devices. As defined herein, the computer-readable media does not include computer-readable transitory media such as modulated data signals and carrier waves.

Persons having ordinary skill in the art may learn that, taking into account various embodiments of the present disclosure, units and algorithm blocks described in each example may be implemented by electronic hardware, or in a combination of computer software and electronic hardware. Whether these functions are implemented by using hardware or software depends on specific application, and design constraints of the technical solution. A skilled person may adopt different methods to implement described functions of each specific application, but such implementation should not be considered to extend beyond the scope of the present disclosure.

Persons having ordinary skill in the art may clearly understand that, for convenient and concise of the description, specific work process of foregoing system, device and unit may refer to a corresponding process in method embodiments, which are not repeated here.

In the embodiments of the application, it should be understood that, the disclosed device and method may be implemented by using other methods. For example, device embodiments described above are only illustrative, e.g., division of the unit is only a logical division, there may be additional division methods during actual implementation. For example, multiple units or components may be combined, or integrated into another system. Alternatively, some features may be omitted, or not performed. From another point of view, the mutual coupling shown or discussed, or direct coupling, or communication connection may be through some interfaces. The indirect coupling, or communication connection among devices or units may be electronic, mechanical, or in other form.

Units described as separate components may be, or may be not physically separated. Components, displayed as units, may be or may be not a physical unit, which may be located in one place, or may be distributed to multiple network units.

Some units, or all the units may be selected to implement the objectives of the solution in the embodiment, based on actual requirements.

In addition, in various embodiments of the present disclosure, each functional unit may be integrated into one processing unit. Alternatively, each unit may exist physically alone. Still alternatively, two or more units may be integrated into one unit.

When the functions are implemented in the form of a software functional unit, and sold or used as an independent product, such software functional unit may be stored in a computer readable storage medium. On the basis of such understanding, essence of technical solution in the present disclosure, or a part thereof contributing to the existing technology, or just a part of the technical solution may be demonstrated with a software product. The computer software product is stored in a storage medium, which includes several instructions to enable a computer device (which may be a Personal Computer (PC), a server, or a network device, and so on) to execute all the blocks, or some blocks in a method of each embodiment in the present disclosure. The foregoing storage medium includes a U disk, a mobile hard disk, a Read-Only Memory (ROM), a Random Access Memory (RAM), a disk, or a Compact Disk (CD), or various mediums which may store program codes.

Foregoing describes optional implementation modes of the present disclosure, but the protection scope of the present disclosure is not limited thereto. For persons having ordinary skill in the art, several improvements and changes may be made, without departing from the principle of the present disclosure. These improvements and changes should also be within the scope of the present disclosure. Therefore, the protection scope of the present disclosure should be determined by the scope of the claims.

What is claimed is:

1. An information transmission method applied to a user equipment (UE), comprising:
   when collision between scheduling request (SR) information to be transmitted by the UE and information on physical uplink control channel (PUCCH) occurs, transmitting the SR information and/or the information on the PUCCH;
   wherein the transmitting the SR information and/or the information on the PUCCH, comprises:
   performing phase rotation on a symbol at a demodulation reference signal (DMRS) position of the PUCCH, which is closest to a subsequent appearance position of the SR information;
   using the phase-rotated symbol at the DMRS position to carry the SR information;
   transmitting the information on the PUCCH, and simultaneously transmitting the SR information carried by the phase-rotated symbol at the DMRS position.

2. The method according to claim 1, wherein the performing phase rotation on a symbol at a demodulation reference signal (DMRS) position of the PUCCH, which is closest to a subsequent appearance position of the SR information, comprises:
   multiplying the symbol at the DMRS position by a predefined phase rotation factor, thereby performing phase rotation on the symbol at the DMRS position.

3. The method according to claim 1, wherein the transmitting the SR information and/or the information on the PUCCH, comprises:
   when a demodulation reference signal (DMRS) position of the PUCCH, which is closest to a subsequent appearance position of the SR information, is corresponding to DMRS in the first column of the PUCCH, performing phase rotation on a symbol at a position of DMRS in one column next to the DMRS in the first column;
   using the phase-rotated symbol at the position of DMRS in one column next to the DMRS in the first column to carry the SR information;
   transmitting the information on the PUCCH, and simultaneously transmitting the SR information carried by the phase-rotated symbol at the position of DMRS in one column next to the DMRS in the first column.

4. The method according to claim 1, wherein the PUCCH is in a long PUCCH format and carries information which is greater than 2 bits.

5. An information transmission method applied to a network device, comprising:
   when collision between scheduling request (SR) information to be transmitted by a user equipment (UE) and information on physical uplink control channel (PUCCH) occurs, receiving the SR information and/or the information on the PUCCH transmitted by the UE;
   wherein the receiving the SR information and/or the information on the PUCCH transmitted by the UE, comprises:
   receiving the information on the PUCCH, and the SR information carried by a phase-rotated symbol at a demodulation reference signal (DMRS) position of the PUCCH, which is closest to a subsequent appearance position of the SR information, wherein the information on the PUCCH and the SR information are simultaneously transmitted by the UE.

6. The method according to claim 5, wherein the receiving the SR information and/or the information on the PUCCH transmitted by the UE, comprises:
   receiving the information on the PUCCH, and the SR information carried by a phase-rotated symbol at a position of DMRS in one column next to DMRS in the first column of the PUCCH, wherein the information on the PUCCH and the SR information are simultaneously transmitted by the UE;
   wherein a DMRS position of the PUCCH, which is closest to a subsequent appearance position of the SR information, is corresponding to DMRS in the first column of the PUCCH.

7. A network device comprising: a memory, a processor, and a computer program stored on the memory and executable on the processor; wherein the computer program is executed by the processor to implement steps of the method according to claim 5.

8. The method according to claim 5, wherein the PUCCH is in a long PUCCH format and carries information greater than 2 bits.

9. A user equipment (UE) comprising: a memory, a processor, and a computer program stored on the memory and executable on the processor; wherein the computer program is executed by the processor to implement steps:
   when collision between scheduling request (SR) information to be transmitted by the UE and information on physical uplink control channel (PUCCH) occurs, transmitting the SR information and/or the information on the PUCCH;
   wherein when transmitting the SR information and/or the information on the PUCCH, the computer program is executed by the processor to implement steps:
   performing phase rotation on a symbol at a demodulation reference signal (DMRS) position of the PUCCH, which is closest to a subsequent appearance position of the SR information;

using the phase-rotated symbol at the DMRS position to carry the SR information;
transmitting the information on the PUCCH, and simultaneously transmitting the SR information carried by the phase-rotated symbol at the DMRS position.

10. The user equipment according to claim 9, wherein when performing phase rotation on a symbol at a demodulation reference signal (DMRS) position of the PUCCH, which is closest to a subsequent appearance position of the SR information, the computer program is executed by the processor to implement steps:
multiplying the symbol at the DMRS position by a predefined phase rotation factor, thereby performing phase rotation on the symbol at the DMRS position.

11. The user equipment according to claim 9, wherein when transmitting the SR information and/or the information on the PUCCH, the computer program is executed by the processor to implement steps:
when a demodulation reference signal (DMRS) position of the PUCCH, which is closest to a subsequent appearance position of the SR information, is corresponding to DMRS in the first column of the PUCCH, performing phase rotation on a symbol at a position of DMRS in one column next to the DMRS in the first column;
using the phase-rotated symbol at the position of DMRS in one column next to the DMRS in the first column to carry the SR, information;
transmitting the information on the PUCCH, and simultaneously transmitting the SR information carried by the phase-rotated symbol at the position of DMRS in one column next to the DMRS in the first column.

12. The user equipment according to claim 9, wherein the PUCCH is in a long PUCCH format and carries information which is greater than 2 bits.

\* \* \* \* \*